United States Patent Office 2,801,940
Patented Aug. 6, 1957

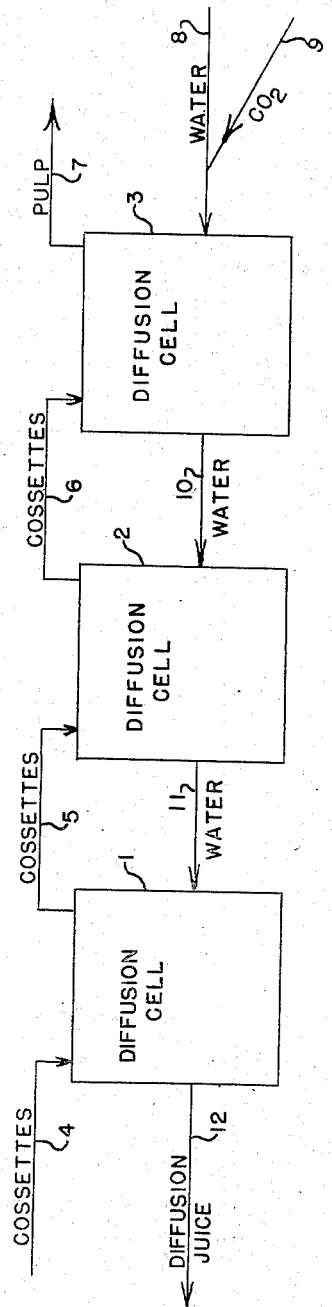
J. B. STARK
A. E. GOODBAN
INVENTORS

2,801,940

RECOVERY OF SUGAR FROM SUGAR BEETS

John B. Stark, Berkeley, and Alan E. Goodban, Walnut Creek, Calif., assignors to the United States of America as represented by the Secretary of Agriculture Application July 11, 1956, Serial No. 597,308

4 Claims. (Cl. 127—44)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the extraction of sugar from sugar beets and is primarily concerned with improvements in the conventional diffusion process whereby to obtain a sugar-containing diffusion juice which has a reduced content of colloidal impurities and from which sugar can be obtained more efficiently and economically. A further aspect of the invention is that the beet pulp from which the sugar has been extracted is in improved condition as regards further processing treatment, for example, pressing and drying. Further objects and advantages of the process will be obvious from the following description taken in connection with the attached drawing which schematically depicts apparatus adapted for applying the process of this invention.

In the production of sugar from sugar beets, the beets are first washed, then cut into strips known as cossettes. These cossettes are subjected to diffusion, that is, they are contacted with warm water to cause the sugar in the beet tissue to diffuse into the water. The diffusion may be carried out batchwise or, more efficiently, by a continuous process. In the continuous process, the cossettes are carried through a series of about 20 cells by the use of drag chains, helical scrolls, or other mechanical devices. At the same time water is passed through the cells in a direction counter-current to the direction of cossette travel. The resulting sugar solution, known as raw or diffusion juice, is then purified and subjected to evaporation and crystallization to obtain pure crystalline sugar.

The diffusion process is a key step in the entire operation and its effectiveness involves many factors. For example, essentially all sugar in the beets must be extracted for the production to be economically sound. The extraction of sugar must be essentially complete yet the extraction of non-sugars must be kept at a minimum, since increased amounts of non-sugars introduce complications in the juice purification steps, necessitating the use of more reagents, such as lime, filter aid, carbon dioxide, etc. and also increasing the amount of non-crystallizable sugars remaining in the less valuable molasses by-product. Also, the extraction of sugar from the beets must be accomplished with a minimum amount of water, because the water must eventually be evaporated and the production will not be profitable unless the amount of water used is kept low so that the cost of evaporation will not be excessive. The diffusion process provides the raw material from which the crystalline sugar is eventually produced and every defect or disadvantage occurring during diffusion is passed along through the process and thus imposes a burden on subsequent operations.

In commercial practice at least part of the water required for the diffusion is water recovered from various processes about the factory. The use of such recovered water reduces the total water consumption of the factory and thus involves considerable savings for each campaign. One disadvantage of this procedure, the significance of which has not been fully appreciated heretofore, is that the recovered waters contain ammonia and the presence of this ammonia in the diffuser leads to extraction of increased amounts of colloidal materials from the beet tissue. These colloidal materials are thus present in the diffusion juice and introduce complications into the purification procedure by decreasing sedimentation and filtration rates. The colloidal impurities are largely those of a polysaccharide nature such as araban and pectin although proteinaceous materials may also be included. The presence of the ammonia in the make-up water may be explained as follows: The diffusion juice contains distinct amounts of soluble nitrogenous compounds such as betaine and amino acids. When the diffusion juice is purified most of these soluble nitrogenous compounds remain in the product—the thin juice. When the thin juice is subjected to evaporation, ammonia is evolved together with water vapor, the ammonia being derived from decomposition of the nitrogenous compounds. It is believed that decomposition of glutamine is one of the main factors which produce ammonia. When the vapors from the evaporation are condensed, ammonia is present in the condensate, this condensate being generally recycled to the diffusion system for addition to the other waters applied to the beets for extraction of sugar. When this water containing ammonia is applied in the diffusion process, increased extraction of colloids occurs, as explained above.

In accordance with the present invention the disadvantageous properties of ammonia in the diffusion water are counteracted by addition of carbon dioxide thereto either prior to contact between the water and the beets or simultaneously with contact of beets and water, the amount of carbon dioxide added being sufficient to establish at least neutral conditions. As a result of the reduced alkalinity of the water lesser amounts of colloids are extracted from the beet tissue. Consequently, the diffusion juice recovered from the process can be purified more efficiently and expeditiously. Another advantage is that the extracted pulp is not slimy and is firm in texture so that it can be efficiently processed as by pressing and drying to make animal feeds.

Addition of carbon dioxide to the diffusion water does not introduce any complications in juice purification as the carbonate ions are removed as calcium carbonate during the usual lime-defecation process.

Reference is now made to the annexed drawing which schematically illustrates equipment for applying the process of the invention.

In the drawing, 1, 2, and 3 represent three cells of a continuous diffusion system. For the sake of simplifying the drawing, only three cells are shown but it is obvious that the system can have as many cells as is necessary.

Fresh cossettes are introduced into cell 1 as indicated by arrow 4, the cossettes traveling from one cell to another as depicted by arrows 5 and 6 and the extracted, essentially sugar-free pulp being removed from cell 3 as indicated by arrow 7.

Simultaneously, water containing ammonia is introduced into cell 3 via pipe 8. At the same time carbon dioxide gas is introduced into the water stream by pipe 9 so that the water entering cell 3 is essentially saturated with carbon dioxide. The water progresses from cell 3 to cells 2 and 1 via pipes 10 and 11 and the final diffusion juice containing extracted sugar is discharged via pipe 12.

In applying this invention to countercurrent diffusion, the carbon dioxide is applied at the pulp end of the system, that is, the point in the system where most of the sugar has already been extracted from the beet material and this material is contacted with entering water. The reason for introducing the carbon dioxide at this part of the system is that here it accomplishes the best result. This situation can be explained as follows: The raw cossettes as they enter cell 1 contain substantial quantities of betaine, amino acids, and other soluble substances which exhibit buffering capacity. Because of this inherent buffering capacity, contact of the beets with ammonia-containing water will not extract increased amounts of colloidal materials; the buffers in the beet tissue counteract the alkalinity of the water. However, by the time the cossettes reach the end of the system, these buffers have been extracted from the beet tissue. Hence at this stage, the beet material is extremely susceptible to the deleterious effect of an alkaline extracting solvent. By applying the carbon dioxide in the zone or zones of the diffusion system where the buffering agents in the beet material have largely been removed, one is assured that the extraction of colloids will be inhibited.

In the drawing and as explained above, carbon dioxide is introduced into the water entering the pulp end of the diffusion battery. Modifications of this system are of course within the scope of this invention. For example, the carbon dioxide can be introduced continuously into cell 3 by the use of a sparger or other suitable device located at the base of the cell. Further, the carbon dioxide need not be applied solely to the last cell at the pulp end of the battery but can be applied to a series of cells at the pulp end of the diffusion battery. For minimum extraction of colloids, the carbon dioxide is introduced into all the cells at the pulp end of the system in which the beet material is substantially devoid of buffering capacity.

The amount of carbon dioxide to be added will depend mainly on the amount of ammonia in the water introduced into the diffusion system. In general, enough carbon dioxide should be introduced so that the water is at least neutral and preferably acidic in reaction, thus the pH of the water may be from about 5 to 7. In many cases the simplest procedure is to add enough $CO_2$ so that the water, or system of water and beet material, is saturated with carbon dioxide.

The invention is further demonstrated by the following illustrative examples. In the experiments presented below, sugar beet pulp was extracted with various solvents as representing materials and conditions which exist in the last cell of a conventional diffusion system.

Example I (A) Fresh sugar beet cossettes were extracted with water to remove essentially all the sugar; residual sugar was on the order of 0.1 to 0.2%. Three hundred grams of the resulting wet pulp was extracted with 1500 ml. of water to which a few drops of ammonia had been added thus to give a pH of 10.4. The extraction was conducted at 75° C. for one hour. The extract was separated by filtration from the pulp and evaporated to volume of 20 ml. To this concentrated extract was added 7 volumes of ethyl alcohol and the precipitated material was collected on a filter, dried, and weighed. A yield of 1.8 g. of alcohol-insoluble material (araban, pectin, and other colloidal substances) was obtained.

(B) The experiment as decribed above was repeated except that in this case, carbon dioxide was added to the ammoniated water prior to extraction of the beet pulp. The amount of carbon dioxide was such that the water had a pH of 5.5. In this case the yield of alcohol-insoluble material was only 0.42 g.

It is evident from the above that by addition of carbon dioxide in the ammoniated water used in the extraction the amount of colloidal material extracted from the beet tissue was reduced to one-quarter of the amount extracted from the beets where carbon dioxide was not employed.

It was further observed that the pulp extracted as in part B was less slimy and firmer in texture than the pulp extracted as in part A. This indicated that the addition of carbon dioxide improved the processing characteristics of the pulp from the standpoint of pressing and drying.

Example II

Samples of essentially sugar-free beet pulp were extracted with various solvents as described below. In each case 300 grams of wet pulp and 1500 ml. of solvent were used and the extraction was for one hour at 75° C. The solvents were:

A. Water containing a few drops of ammonium hydroxide, sufficient to give a pH of 9.5.
B. Freshly-boiled distilled water.
C. Ammoniated water as in part A, above, except that in this case carbon dioxide was continuously bubbled through the extraction mixture during the extraction process.

In each case, the amount of alcohol-insoluble material in the extract was determined as set forth in Example I. The results obtained are tabulated below:

| Expt. | Solvent | Alcohol-insoluble material, grams |
| --- | --- | --- |
| A | Ammoniated water | 0.78 |
| B | Boiled, distilled water | 0.178 |
| C | Ammoniated water plus added $CO_2$ | 0.199 |

It is evident from the above data, that the addition of carbon dioxide to the ammoniated water gave virtually as low an extraction of colloidal materials as if the extraction were accomplished with water completely free from any solid or gaseous components, i. e., boiled distilled water.

Having thus described the invention, we claim:

1. In the process of recovering sugar from sugar beets wherein beet material is extracted with water containing dissolved ammonia, the improvement which comprises introducing carbon dioxide into the water in an amount sufficient to establish at least neutral conditions, whereby to minimize extraction of colloidal substances from the beet tissue.

2. In the process of recovering sugar from sugar beets wherein beet material in a series of diffusion zones is successively extracted with allotments of water containing successively diminished proportions of sugar and the beet material in a final diffusion zone is extracted with essentially sugar-free water containing dissolved ammonia, the improvement which comprises introducing carbon dioxide into at least the final diffusion zone in an amount sufficient to establish at least neutral conditions, whereby to minimize extraction of colloidal substances from the beet tissue.

3. In the process of recovering sugar from sugar beets wherein beet material successively transported through a series of diffusion zones and wherein water containing dissolved ammonia is introduced into the system and is conducted through said diffusion zones in a direction countercurrent to the flow of beet material, the improvement which comprises introducing carbon dioxide into at least one of said diffusion zones wherein the beet material is essentially devoid of buffering components, the amount of carbon dioxide being sufficient to establish at least neutral conditions, whereby to minimize extraction of colloidal substances from the beet tissue.

4. In the process of preparing essentially sugar-free pulp from sugar beets wherein sugar beet material in a series of diffusion zones is successively extracted with allotments of water containing successively diminished proportions of sugar and the beet material in a final diffusion zone is extracted with essentially sugar-free water containing dissolved ammonia, the improvement which comprises introducing carbon dioxide gas into at least the final diffusion zone in an amount sufficient to establish at least neutral conditions, whereby to obtain a pulp which exhibits a less slimy and firmer texture than the pulp produced in the absence of added carbon dioxide.

References Cited in the file of this patent

UNITED STATES PATENTS

| | | |
|---|---|---|
| 1,887,050 | Vierling | Nov. 8, 1932 |
| 2,557,800 | Seailles | June 19, 1951 |
| 2,557,996 | Peterson | June 26, 1951 |
| 2,697,049 | Brieghel-Muller | Dec. 14, 1954 |